Oct. 27, 1970 R. H. ANDERSON ET AL 3,536,391
FLARE CONTROL SHIELD FOR AN OVERHEAD PROJECTOR
Filed March 4, 1968

INVENTORS
RAYMOND H. ANDERSON
ROGER H. APPELDORN
BY Kinney, Alexander,
Sell, Steldt & DeLaHunt
ATTORNEYS

3,536,391
FLARE CONTROL SHIELD FOR AN OVERHEAD PROJECTOR
Raymond H. Anderson, Stillwater, and Roger H. Appeldorn, White Bear Lake, Minn., assignors to Minnesota Mining and Manufacturing Company, St. Paul, Minn., a corporation of Delaware
Filed Mar. 4, 1968, Ser. No. 710,317
Int. Cl. G03b 21/28
U.S. Cl. 353—98    5 Claims

ABSTRACT OF THE DISCLOSURE

Flare in an overhead projector is reduced by incorporating in the projection head a light-absorptive shield having a semi-elliptical opening for passage of the light beam.

---

This invention relates to overhead projectors and, in one particular aspect, to means for improving the clarity, brightness, and contrast of images projected from overhead projectors whose projection optics consists of two meniscus lenses and an intervening reflecting plane.

Projection optics of the type indicated have been shown in U.S. Pat. No. 3,209,646 and in greater detail in U.S. Pat. No. 3,126,786. They consist generally of a pair of meniscus lenses arranged at approximately a right angle to each other, and a planar reflector at the hypotenuse, i.e. substantially equiangularly between the two. This type of optics gives a desirable field flattening effect, which is particularly important in overhead projectors designed for projection of images of full letter size transparencies onto large viewing screens at a short distance as in classrooms and lecture rooms. However, it has been found difficult to obtain fully adequate clarity of projected small numbers and other intricate markings with such projectors; and projected images in color are frequently found to be lacking in brightness and contrast. These difficulties have been traced in large part to the presence of internal reflections or flare.

The various projection image defects caused by flare, such as halo images, image blurring, and loss of contrast, may in some instances be reduced or eliminated by the substitution of more complicated projection optics, such for example as a Cooke triplet. The increased cost of such systems requires them to be used at full aperture and results in reduced depth of field, so that images cannot satisfactorily be projected from wrinkled transparencies.

Figure 1:
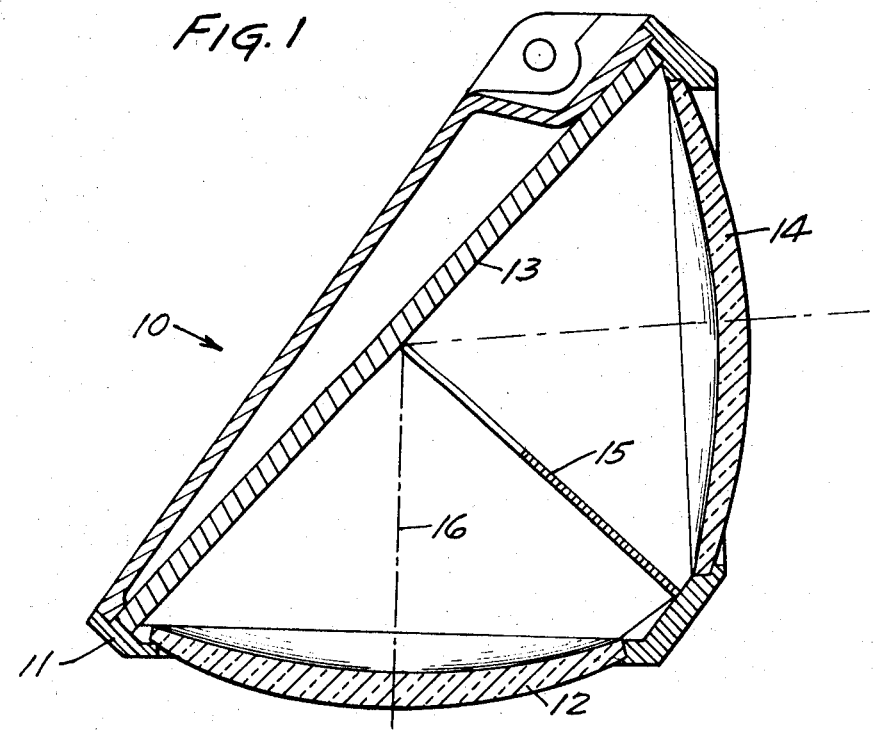
Figure 2:
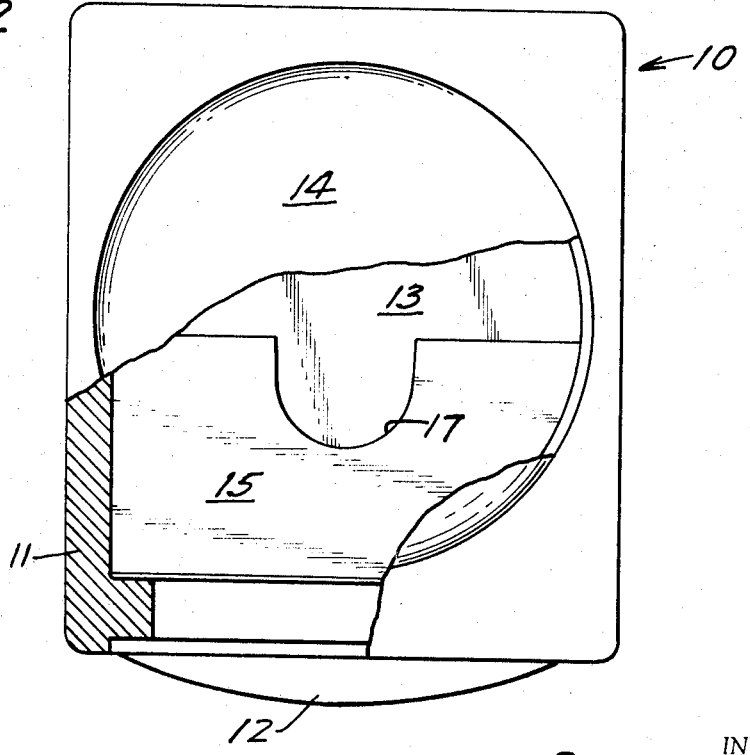

It has now been found possible to obtain projection images of high clarity, brightness and contrast while still maintaining a desirably flat field by employing with the combination of meniscus lenses and planar reflector a simple but highly effective light-absorbing shield member disposed between the lenses and substantially perpendicularly to the reflector, as will now be more fully described in conjunction with the accompanying drawing, in which:

FIG. 1 is a sectional side elevation of an exemplary projection head modified in accordance with the invention, and FIG. 2 is a partial front elevation of the head of FIG. 1, with portions cut away to show interior structure.

The projection head 10 consists generally of a frame assembly 11 supporting a first meniscus lens 12, a reflecting plane 13, a second meniscus lens 14, and a light-absorbing shield 15. The two lenses are at approximately a right angle to each other, and the reflecting plane extends across the hypotenuse of that angle so that a light ray 16 centrally entering lens 12 is reflected and emerges centrally of lens 14. The shield 15 contacts and is perpendicular, or approximately so, to the reflector 13 and at least approximately at the point of contact of the entering ray 16. A central portion is removed from the side of the shield adjacent the reflector, leaving an approximately semi-elliptical opening 17. The size and shape of the opening 17 is such that substantially the entire beam of light entering from the stage of the projector and passing through lens 12 is permitted to reach the reflective surface of reflector 13 and to be reflected to, and emerge from, lens 14.

The outline of the opening 17 is most conveniently obtained by substituting a semi-transparent screen for the plate 15 and permitting the full light beam from the source optics to focus thereon, and moving the screen slightly to either side of the point of contact of the central ray from lens 12 until a position is reached showing the minimum light pattern area. With the lens 14 removed it is then a simple matter to mark the boundary of the beam on the plate, thereby forming a pattern from which shield 15 is subsequently constructed. Since the specific dimensions of the pattern will vary slightly with changes in the angle of entry of the ray 16, it is possible to select in this way a pattern which represents a compromise between the best outlines for the several possible positions and which is entirely satisfactory under all use conditions.

For some less exacting applications the projection head may contain a single meniscus lens 12 together with the mirror and flare shield, the lens 14 being omitted.

In an illustrative example wherein the projection head contains a pair of meniscus lenses 12, 14, each having a useful diameter of slightly more than 3¼ inches (about 8½ cm.) and symmetrically disposed with their optical axes each at 39 degrees from the plane of the mirror 13, the opening 17 is semi-elliptical, and the major and minor axes of the ellipse are 3.12 and 1.60 inches respectively.

The surface of the screen 15 may be rendered light-absorptive in any desired manner, a convenient means being by the application of a coating of black light-absorbing paint. The interior portions of the frame 11 exposed to light are similarly coated, but in the absence of the shield 15 this alone does not adequately overcome the formation of false images and the reduction of clarity and brightness at the projection screen.

The screen 15 is supported, e.g. at its side edges from the frame 11 in any convenient manner. The centrally open edge contacts or is closely adjacent the front-surface reflector 13 without exerting any pressure thereagainst which might cause deformation of the reflector and loss of optical precision. A convenient structure employs a thin rigid aluminum panel slidingly fitting within appropriate grooves or channels or adhered to ledges formed in the sidewalls of the frame. The forward edge segments desirably are held to the surface of the reflector with a narrow line of non-reflective rubbery adhesive applied along the contacting edges. Where the angles between the two lenses and between lenses and reflector are variable, it will be apparent that equivalent but specifically different support means will be required in order to maintain the position of the screen substantially perpendicular to the reflector and equiangular with respect to the lenses.

What is claimed is as follows:

1. A flare-controlling projection head assembly for an overhead projector comprising a planar reflector, a first meniscus lens at an angle to said reflector for directing a converging light beam toward said reflector, and a light-absorbing plate disposed substantially perpendicularly against said reflector and at least approximately at the point of incidence of a central ray of said beam and having a generally semi-elliptical opening centrally of the side nearest said reflector for permitting passage of said beam.

2. The assembly of claim 1 including a second meniscus lens opposite said first lens for converging the reflected beam toward a viewing surface.

3. The assembly of claim 2 wherein said first and second lenses are at substantially equal opposite angles with said reflector.

4. The assembly of claim 2 wherein said plate is disposed substantially at the position of minimum light pattern area between said first and second lenses and said opening coincides with said area.

5. Method of making a flare-controlling projection head assembly having a planar reflector and a meniscus lens at an angle thereto for directing a converging light beam toward said reflector, said method comprising providing a light-absorbing flat screen having a generally semi-elliptical opening centrally of one side and coinciding with the minimum light pattern area obtained within said projection head under image projection conditions, and disposing said screen within said head substantially perpendicular to said reflector and with said opening coinciding with the position of said area.

References Cited
UNITED STATES PATENTS

| | | |
|---|---|---|
| 703,858 | 7/1902 | Vautier. |
| 1,333,033 | 3/1920 | Narodick _____ 240—46.01 |
| 1,662,693 | 3/1928 | Astafiev _____ 350—202 |
| 1,708,776 | 4/1929 | Polen _____ 240—46.01 |
| 2,034,441 | 3/1936 | Petit et al. _____ 355—66 X |
| 3,126,786 | 3/1964 | Appeldorn _____ 353—98 |

WILLIAM D. MARTIN, Jr., Primary Examiner

U.S. Cl. X.R.

350—276